Jan. 30, 1968 W. T. MADEIRA 3,365,782
SNAP RING TOOL
Filed Aug. 24, 1966

INVENTOR.
WILLIAM T. MADEIRA
BY
Paul + Paul
ATTORNEYS.

Patent text, page 1 of 3,365,782

3,365,782
SNAP RING TOOL
William T. Madeira, Lancaster, Pa., assignor to K-D Manufacturing Company, Lancaster, Pa., a corporation of Pennsylvania
Filed Aug. 24, 1966, Ser. No. 574,671
4 Claims. (Cl. 29—229)

In my Patent No. 3,228,101, issued Jan. 11, 1966, I described a snap ring tool. The present application is addressed to an improved snap ring tool which is different both in structure and operation from the tool described in said patent.

The patented tool comprises a shaft mounting a handle on one end thereof, an axially fixed collar adjacent the handle and a nut which engages threads formed at the other end of the shaft. Articulated links and lever arms are mounted upon said collar and nut and the lever arms are arranged to carry a pair of jaws and a pair of pins disposed beyond the threaded end of said shaft. When the shaft is turned in one direction, the nut moves axially of the shaft toward the collar and in response thereto the articulated members close the jaws and bring the pins together. When the shaft is turned in the opposite direction, the nut moves axially of the shaft away from the collar and in response thereto the articulated members open the jaws and spread the pins. Axial movement of the collar relative to the shaft is restrained. The distance which the jaws and pins move depends upon the distance which the nut moves along the threaded portion of the shaft relative to the fixed collar. All of the nut motion and all of the force required to overcome the resistances presented by the linkages of the tool and the configuration of the snap ring must be transmitted through the nut and the shaft threads which it engages. Moreover, the combination of fixed collar with articulated arms sometimes presents objectionable resistance to change particularly on high tension snap rings. The amount of jaw movement per turn of the shaft and the conversion efficiency are not entirely satisfactory for they preclude maximum efficiency in the use of the tool. Therefore, a principal object of the invention is to provide a snap ring tool construction which effects a greater movement of the jaws per turn of the shaft and at the same time provides more efficient and smoother operation.

Other objects of the invention will become apparent when the following description is read with reference to the accompanying drawings, in which.

Figure 1:
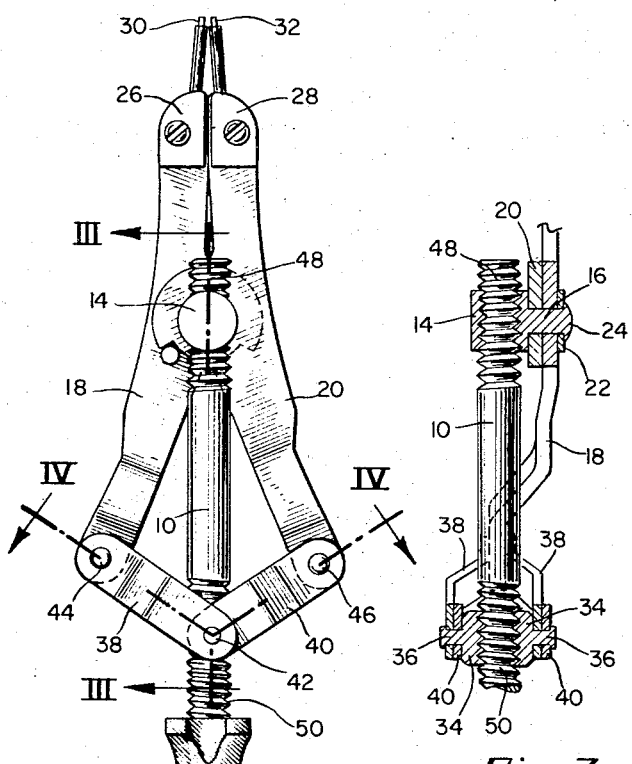
FIGURE 1 is a plan view showing a tool constructed in accordance with the invention with the jaws in fully closed position.
Figure 3:
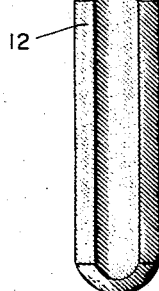
FIGURE 3 is a section on line III—III in FIGURE 1.

It will be understood that the following description is directed to the specific embodiment of the invention shown in the drawings and is not addressed to the scope of the invention, which may be practiced in a variety of forms.

Referring to the drawings, the tool constructed in accordance with the invention comprises a shaft 10 having threaded upon one end thereof a handle 12, and having threaded upon the other end thereof a nut 14. Extending outwardly from the nut 14 normal to the shaft 10 is a pivot 16, which extends through a pair of lever arms 18 and 20 and is secured by a washer 22 and a head 24 formed on the pivot 16. Thus the lever arms 18 and 20 are rockably mounted upon the pivot. The fore ends of the lever arms 18 and 20 extend parallel to each other from the pivot 16 beyond the fore end of the shaft 10 and carry respectively a pair of jaw plates 26 and 28 and a pair of points 30 and 32. The aft ends of the lever arms 18 and 20 diverge rearwardly from the nut 14.

Also threaded upon the shaft 10 is a nut 34 from which there extend in opposite directions a pair of coaxial pivots 36 normal to the shaft 10. Corresponding ends of a pair of links 38 and 40 are connected to the pivots 36 and are secured by means of heads 42 formed on the pivots. The links 38 and 40 diverge forwardly from the pivots 36, and the corresponding free ends of the links are connected to the corresponding proximate ends of the lever arms 18 and 20 by means of pivots 44 and 46.

It will be noted that the threads on the fore end of the shaft 10 which receive the nut 14 are right-hand threads, designated 48, while the threads adjacent the handle 12 which receive the nut 34 are left-hand threads, designated 50. The axes of the pivots 16, 36, 44 and 46 are parallel to each other and normal to the shaft 10. The links 38 and 40 are equal in effective length, and the lever arms 18 and 20 are equal in length from the pivots 44 and 46 to the pivot 16.

Figure 2:
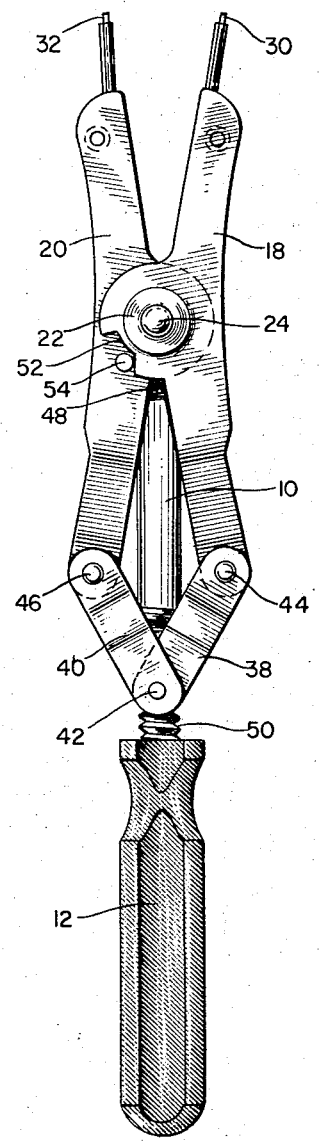
FIGURE 2 is a bottom view of the tool shown in FIGURE 1 with the jaws in fully open position.
Figure 4:
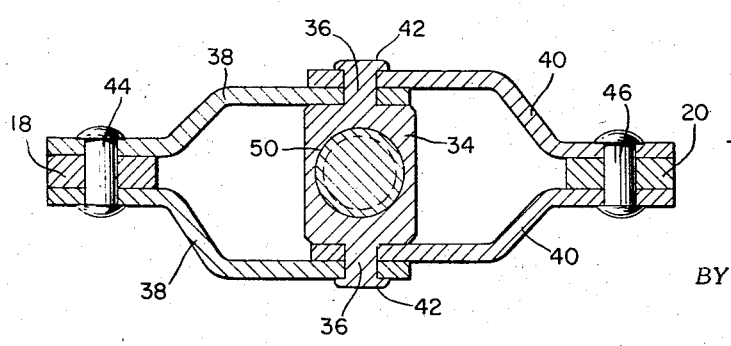
FIGURE 4 is an enlarged section on line IV—IV in FIGURE 1.

In the operation of the tool, rotating the handle 12 causes the nuts 14 and 34 to move axially of the shaft toward or away from each other, depending upon the direction in which the handle is turned. When they move away from each other, the lever arms 18 and 20 rock on the pivot 16 and the jaw plates 26 and 28 and the points 30 and 32 move away from each other from the position of FIGURE 1 to that of FIGURE 2. When the nuts 14 and 34 move toward each other, the lever arms 18 and 20 rock in the opposite direction on the pivot 16 and the jaw plates 26 and 28 and the points 30 and 32 move toward each other from the position of FIGURE 2 to that of FIGURE 1.

It will be noted that the amount of movement of the jaw plates 26 and 28 and of the points 30 and 32 relative to each other in response to turning of the shaft 10 depends upon the amount of movement of the nuts 14 and 34 axially of the shaft 10 and that for one revolution of the shaft 10 the nuts 14 and 34 move toward or away from each other a distance equal to twice the thread pitch. Thus the jaw plates 26 and 28 and the points 30 and 32 may be brought together and spread apart much more rapidly using the tool of the present invention and the overall operation of the tool is more efficient.

Maximum movement of the jaw plates 26 and 28 and of the points 30 and 32 relative to each other in response to turning of the shaft 10 in either direction is limited by a stop 54 on the lever arm 20 working in an arcuate recess 52 in the lever arm 18.

It will be understood that the threads at either end of the shaft 10 may be right-hand threads and the threads at the opposite end of the shaft 10 left-hand threads.

Reference may be had to applicant's prior patent for certain details of construction and operation, which have been omitted in the foregoing description as unnecessary to a full and complete understanding of the invention as defined in the appended claims.

What is claimed is:

1. In a tool for expanding and contracting snap rings suitably apertured for receiving the tool, the combination comprising a shaft, a pair of nuts respectively threaded right and left hand upon opposite end portions of said shaft, a pair of links rockably connected to one of said nuts and diverging forwardly therefrom, a pair of lever arms pivotally connected to the free ends of said links, converging forwardly therefrom to the other nut and connected to said other nut for rocking movement of said lever arms and extending forwardly from said other nut beyond the fore end of said shaft in generally parallel relation, and a pair of elements mounted respectively upon the terminal fore portions of said lever arms and extending forwardly in longitudinal continuation thereof for insertion into the tool receiving apertures of the snap ring.

2. The combination according to claim 1 wherein the links are rockably connected to pivot means common thereto and extending outwardly from the associated one of the nuts normal to the shaft, and the lever arms are rockably connected to pivot means common thereto and extending outwardly from the associated one of said nuts normal to the shaft.

3. The combination according to claim 2 wherein the axes of the pivots carried by the nuts and of the pivots connecting the links with the lever arms are all normal to the shaft and parallel with each other.

4. The combination according to claim 3 wherein the links have the same effective length, and the lever arms have the same effective length from the pivots connecting the links with the lever arms to the pivot means to which the lever arms are rockably connected.

No references cited.

OTHELL M. SIMPSON, *Primary Examiner.*

J. PETERS, *Assistant Examiner.*